Dec. 12, 1939.   R. SUSSMAN   2,183,360
DETACHABLE COVER FOR QUILTS AND THE LIKE
Filed July 6, 1937
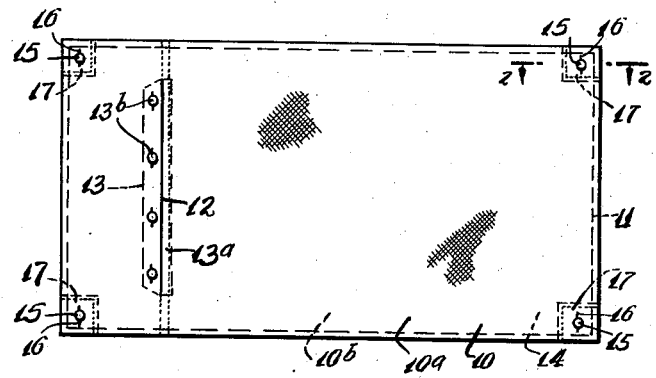
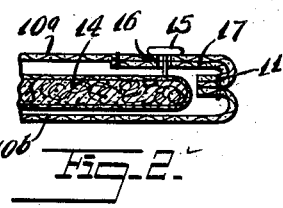
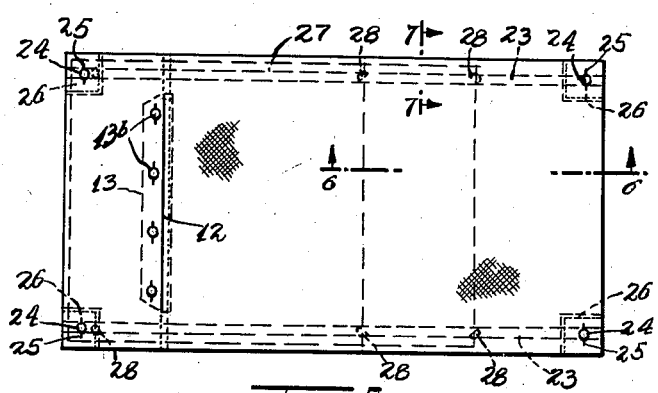
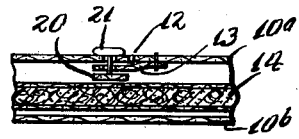
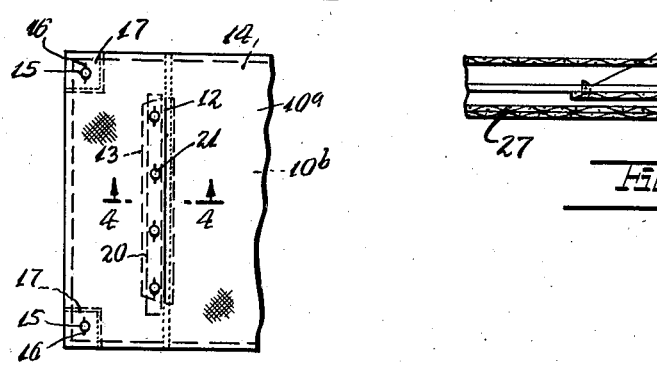
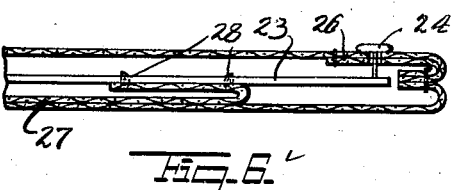
INVENTOR
Riva Sussman
BY
ATTORNEY Patented Dec. 12, 1939

2,183,360

UNITED STATES PATENT OFFICE 2,183,360

DETACHABLE COVER FOR QUILTS AND THE LIKE

Riva Sussman, New York, N. Y.

Application July 6, 1937, Serial No. 152,115

1 Claim. (Cl. 5—335)

This invention relates to new and useful improvements in a detachable cover for quilts and the like.

The invention has for an object the provision of a cover for quilts, blankets and the like and coacting means on the quilt or blanket by which the two may be held in a unit against shifting.

Heretofore it was customary to place quilts, blankets and the like within casings and to make no provision for holding the parts in fixed positions. Consequently, the quilts and the like would shift and the casings at one end would be devoid of quilting material, while at another portion would have excess material. This condition has proved to be very annoying to many persons, and home made contraptions are often employed to remedy this condition. Some people would sew the quilt and quilt casing together at portions; others would pin them together.

This invention proposes a novel construction of cover and quilt arranged for holding these parts relative to each other while at the same time permitting them to be readily disassembled when required.

Another one of the objects of this invention is to provide, in combination with a quilt or blanket a cloth covering casing and cooperative fastening elements on the quilt and casing for holding them fixed together.

Still further the invention proposes to characterize the fastening element as being buttons on the quilt cooperative with buttonholes on portions of the casing.

Another one of the objects is to provide reinforcements for the casing areas surrounding the buttonholes.

Still further the invention proposes an arrangement which will permit portions of the quilt to be folded down within the casing if this is desired, and to be held in the various folded positions.

For further comprehension of the invention, and of the objects and advantages thereof, reference will be had to the following description and accompanying drawing, and to the appended claim in which the various novel features of the invention are more particularly set forth.

Fig. 1 is a plan view of a casing and quilt constructed according to this invention.

Fig. 2 is a sectional view taken on the line 2—2 of Fig. 1.

Fig. 3 is a fragmentary view similar to the left hand portion of Fig. 1 but illustrating a modification of the invention.

Fig. 4 is a sectional view taken on the line 4—4 of Fig. 3.

Fig. 5 is another plan view of a quilt and cover constructed according to a further embodiment of the invention.

Fig. 6 is a sectional view taken on the line 6—6 of Fig. 5.

Fig. 7 is a fragmentary sectional view taken on the line 7—7 of Fig. 5.

The attachable cover for quilts, blankets and the like, according to this invention, comprises a cloth casing 10 having a top panel 10$^a$ and a bottom panel 10$^b$ secured together along their edges by stitches 11. One of the panels is formed with a transverse opening 12 which may be closed by a flap 13 stitched along one side 13$^a$ to one side of the opening and provided with buttons 13$^b$ engaging buttonholes on the other side of the opening. Thus far the casing is conventional.

Within the casing there is a quilt, blanket or the like 14 which is provided with buttons 15 at the corners. These buttons are engageable with buttonholes 16 in the corners of the casing. Reinforcement pieces 17 are stitched down upon the corners of the casing to reinforce the areas provided with the buttonholes.

A feature of the invention resides in the fact that since the quilt and casing are connected together at the corners they must maintain their relative positions.

In Figs. 3 and 4 another embodiment of the same invention has been disclosed in which a modified arrangement for securing the opening 12 closed has been disclosed. According to this form the flap 13 is also provided with buttonholes which are aligned with the buttonholes in the material there-above. A strip of material 20 having buttons 21 at spaced positions is disposed beneath the flap 13 and the buttons 21 engage through the buttonholes in the flap and in the casing material to hold the parts together. In other respects this form of the invention is similar to the previous form and similar parts may be identified by corresponding reference numerals.

In Figs. 5-7 inclusive another modified form of the invention has been disclosed in which an arrangement is provided for holding the quilt in various folded positions in the casing. According to this form there are side strips 23 within the casing along the sides thereof extending the full length of the casing and secured in position by buttons 24 upon the ends of the strips 23 engaging buttonholes 25 in the casing. The corners of the casing in the vicinity of the buttonholes 25 are reinforced with pieces 26. The quilt or blanket 27 is disposed within the casing in the usual manner and safety pins 28 are utilized for securing portions of the quilt or blanket to the strips 23. The quilt or blanket may be folded as shown in Figs. 5 and 6 and the folded portions secured to the strips 23. In this manner the quilt may be held in various relative fixed positions within the casing.

Instead of buttons 15 and buttonholes 16, any other type of fastenings may be used and these fasteners may be attached to the quilt and cover at any desired location.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A device of the type described, comprising a rectangular casing having aperture means therein, a pair of strips of material of a length substantially equal to the length of said casing, cooperating separable fastening elements on the casing adjacent at the corners thereof and on the ends of said strips, respectively, and a quilt or the like secured to said strips in folded condition, said quilt, when unfolded, being substantially equal in length to the length of said casing, the overlapping portion of said folded quilt being secured by detachable fastening means to said strips at each end, respectively.

RIVA SUSSMAN.